US010711502B2

(12) United States Patent
Yokoyama et al.

(10) Patent No.: US 10,711,502 B2
(45) Date of Patent: Jul. 14, 2020

(54) WIRE TYPE WINDOW REGULATOR

(71) Applicant: SHIROKI CORPORATION, Fujisawa-shi, Kanagawa (JP)

(72) Inventors: Kazuya Yokoyama, Fujisawa (JP); Atsushi Muramatsu, Fujisawa (JP); Kenji Yamamoto, Fujisawa (JP); Kenichi Suzuki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 16/083,251

(22) PCT Filed: Mar. 21, 2017

(86) PCT No.: PCT/JP2017/011225
§ 371 (c)(1),
(2) Date: Sep. 7, 2018

(87) PCT Pub. No.: WO2017/203811
PCT Pub. Date: Nov. 30, 2017

(65) Prior Publication Data
US 2019/0100954 A1 Apr. 4, 2019

(30) Foreign Application Priority Data
May 24, 2016 (JP) ................. 2016-103369

(51) Int. Cl.
E05F 11/48 (2006.01)
B60J 1/17 (2006.01)
(Continued)

(52) U.S. Cl.
CPC ............. *E05F 11/48* (2013.01); *B60J 1/17* (2013.01); *E05D 15/165* (2013.01);
(Continued)

(58) Field of Classification Search
CPC ... E05F 11/48; E05F 15/689; E05F 2201/684; E05D 15/165; B60J 1/17; E05Y 2900/55; E05Y 2201/684
(Continued)

(56) References Cited

U.S. PATENT DOCUMENTS 4,440,354 A * 4/1984 Kobayashi ............ E05F 11/485
242/371
5,694,719 A * 12/1997 Bejune .................. B60J 5/0402
411/182

(Continued)

FOREIGN PATENT DOCUMENTS

CN 1737318 A 2/2006
JP S60-195467 12/1985
(Continued)

OTHER PUBLICATIONS

International Search Report (PCT/ISA/210) dated Apr. 25, 2017, by the Japan Patent Office as the International Searching Authority for International Application No. PCT/JP2017/011225.
(Continued)

Primary Examiner — Jerry E Redman
(74) Attorney, Agent, or Firm — Buchanan, Ingersoll & Rooney PC

(57) ABSTRACT

A wire type window regulator includes a guide rail, a wire driving mechanism, and a wire guide member. The guide rail guides a slider base to freely move up and down. A window glass is fixed to the slider base. The wire driving mechanism moves the slider base up/down along the guide rail via a drive wire. The wire guide member is disposed on at least one of an upper end and a lower end of the guide rail. The wire guide member changes a routing direction of the drive wire wound around the wire guide member. The wire guide member supports a fixing member that is inserted through
(Continued)

the guide rail and that fixes the guide rail and the wire guide member to the vehicle door panel.

8 Claims, 6 Drawing Sheets

(51) Int. Cl.
    *E05D 15/16*     (2006.01)
    *E05F 15/689*     (2015.01)

(52) U.S. Cl.
    CPC .......... *E05F 11/481* (2013.01); *E05F 15/689* (2015.01); *E05Y 2201/66* (2013.01); *E05Y 2201/684* (2013.01); *E05Y 2600/626* (2013.01); *E05Y 2900/55* (2013.01)

(58) Field of Classification Search
    USPC .......................................... 49/348, 349, 352
    See application file for complete search history.

(56) References Cited

U.S. PATENT DOCUMENTS

| | | | | | |
|---|---|---|---|---|---|
| 6,088,965 | A | * | 7/2000 | Fukumoto | E05F 11/486 49/352 |
| 7,882,658 | B2 | * | 2/2011 | Staser | B60J 5/0416 49/352 |
| 9,222,295 | B2 | * | 12/2015 | Umemura | E05F 11/483 |
| 10,017,979 | B2 | * | 7/2018 | Ando | E05F 11/483 |
| 10,309,140 | B2 | * | 6/2019 | Imaoka | E05F 11/48 |
| 2003/0140562 | A1 | * | 7/2003 | Staser | E05F 11/382 49/352 |
| 2006/0179720 | A1 | * | 8/2006 | Vantrease | E05B 85/10 49/352 |
| 2006/0254146 | A1 | * | 11/2006 | Florentin | E05F 11/382 49/349 |
| 2006/0283088 | A1 | * | 12/2006 | Buchta | E05F 11/483 49/352 |
| 2007/0214726 | A1 | * | 9/2007 | Graf | E05F 11/382 49/352 |
| 2008/0005971 | A1 | * | 1/2008 | Dickie | E05F 15/689 49/349 |
| 2011/0232197 | A1 | | 9/2011 | Suzuki et al. | |
| 2015/0101252 | A1 | * | 4/2015 | Baba | E05F 11/486 49/349 |

FOREIGN PATENT DOCUMENTS

| | | |
|---|---|---|
| JP | H11-13335 A | 1/1999 |
| JP | 2004-116074 A | 4/2004 |
| JP | 2011-202414 A | 10/2011 |
| JP | 2012-233327 A | 11/2012 |

OTHER PUBLICATIONS

Written Opinion (PCT/ISA/237) dated Apr. 25, 2017, by the Japan Patent Office as the International Searching Authority for International Application No. PCT/JP2017/011225.

Office Action (The First Office Action) dated Jun. 14, 2019, by the State Intellectual Property Office of People's Republic of China in corresponding Chinese Patent Application No. 201780015598.3 and an English Translation of the Office Action. (16 pages).

Notice of Reasons for Refusal in Japanese application No. 2017-231326 dated Apr. 7, 2020, 5 pages.

* cited by examiner

WIRE TYPE WINDOW REGULATOR

TECHNICAL FIELD

The present invention relates to a wire type window regulator.

BACKGROUND ART

A wire type window regulator includes a guide rail extending in a longitudinal direction, a slider base supported to this guide rail to freely move up and down and to which a window glass is supported, drive wires to drive this slider base so as to move up and down along the guide rail, and a driving mechanism to drive these drive wires. Upper and lower wire guide members are provided adjacent to upper and lower ends of the guide rail.

With such conventional wire type window regulator, a force attempting to cause a deformation (bow deformation) is applied to the upper and the lower ends of the guide rail via the wire guide members when the slider base (glass) moves up and down. This force of the bow deformation is maximized at ends when the glass is moved up and down. In view of this, conventionally, the upper and the lower wire guide members have been fixed to a door panel (inner panel) of a vehicle (Patent Document 1).

Patent Document 1: JP-A-2012-233327

DISCLOSURE OF THE INVENTION

Problems to be Solved by the Invention

However, with Patent Document 1, the guide rail is not fixed to the door panel of the vehicle but is only fitted to the upper and the lower wire guide members fixed to the door panel of the vehicle. Therefore, the force applied to the guide rail when the glass is moved up and down is supported only by the wire guide members. This possibly results in, for example, the deformation of the wire guide member.

An object of the present invention is to obtain a wire type window regulator that ensures fixing a guide rail and a wire guide member to a door panel of a vehicle at the same time.

Solutions to the Problems

A wire type window regulator of the present invention is a wire type window regulator fixed to a door panel of a vehicle including a guide rail, a wire driving mechanism, and a wire guide member. The guide rail guides a slider base to freely move up and down. A window glass is fixed to the slider base. The wire driving mechanism moves up and down the slider base along the guide rail via a drive wire. The wire guide member is disposed on at least one of an upper end and a lower end of the guide rail. The wire guide member changes a routing direction of the drive wire wound around the wire guide member. The wire guide member supports a fixing member. The fixing member is inserted through the guide rail. The fixing member fixes the guide rail and the wire guide member to the door panel of the vehicle.

The guide rail preferably has front and back surfaces abutting on and sandwiched between the door panel of the vehicle and the fixing member.

The following is preferable. The guide rail, the door panel of the vehicle, and the fixing member are made of a metal. The fixing member is supported to the wire guide member and abuts on one end of the guide rail and the guide rail abutting on the door panel of the vehicle.

The following is preferable. The guide rail has a pair of longitudinal walls. The pair of longitudinal walls are separated in a vehicle front-rear direction and extend in a vehicle-width direction. The wire guide member includes a supporting portion to support the fixing member. The supporting portion abuts on the pair of longitudinal walls of the guide rail.

The following is preferable. The wire guide member includes an insertion portion into which one end of the guide rail is inserted. The insertion portion includes a plurality of ribs. The plurality of ribs extend in an insertion direction of the guide rail. The plurality of ribs linearly contact the inserted guide rail.

The wire guide member may include an elastic locking member. The elastic locking member retains the fixing member supported to the wire guide member.

Effects of the Invention

The present invention can obtain a wire type window regulator that ensures fixing a guide rail and a wire guide member to a door panel of a vehicle at the same time.

DESCRIPTION OF PREFERRED EMBODIMENTS

Figure 1:
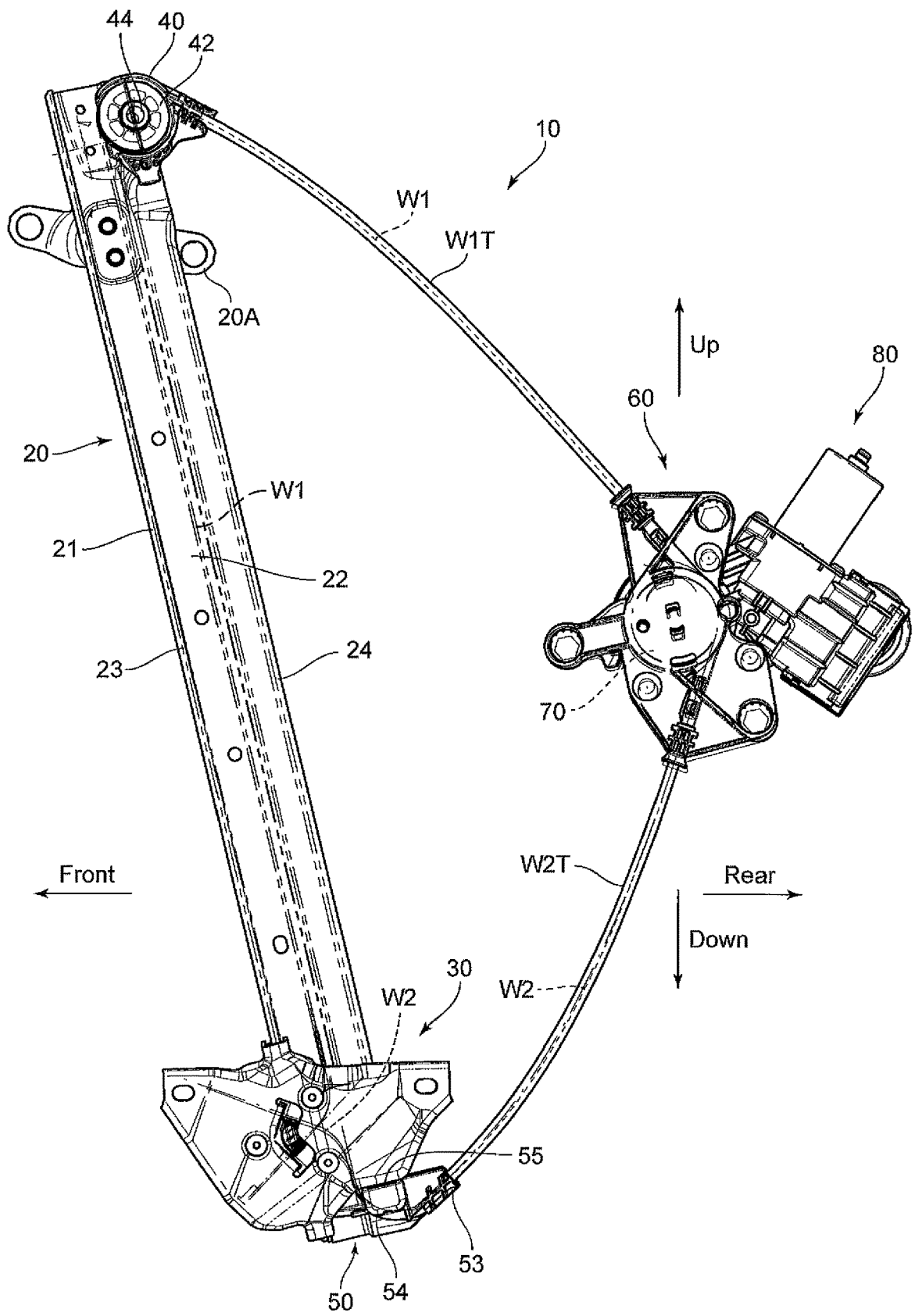
FIG. 1 is a front view viewing a wire type window regulator according to an embodiment from a vehicle outer side.
Figure 2:
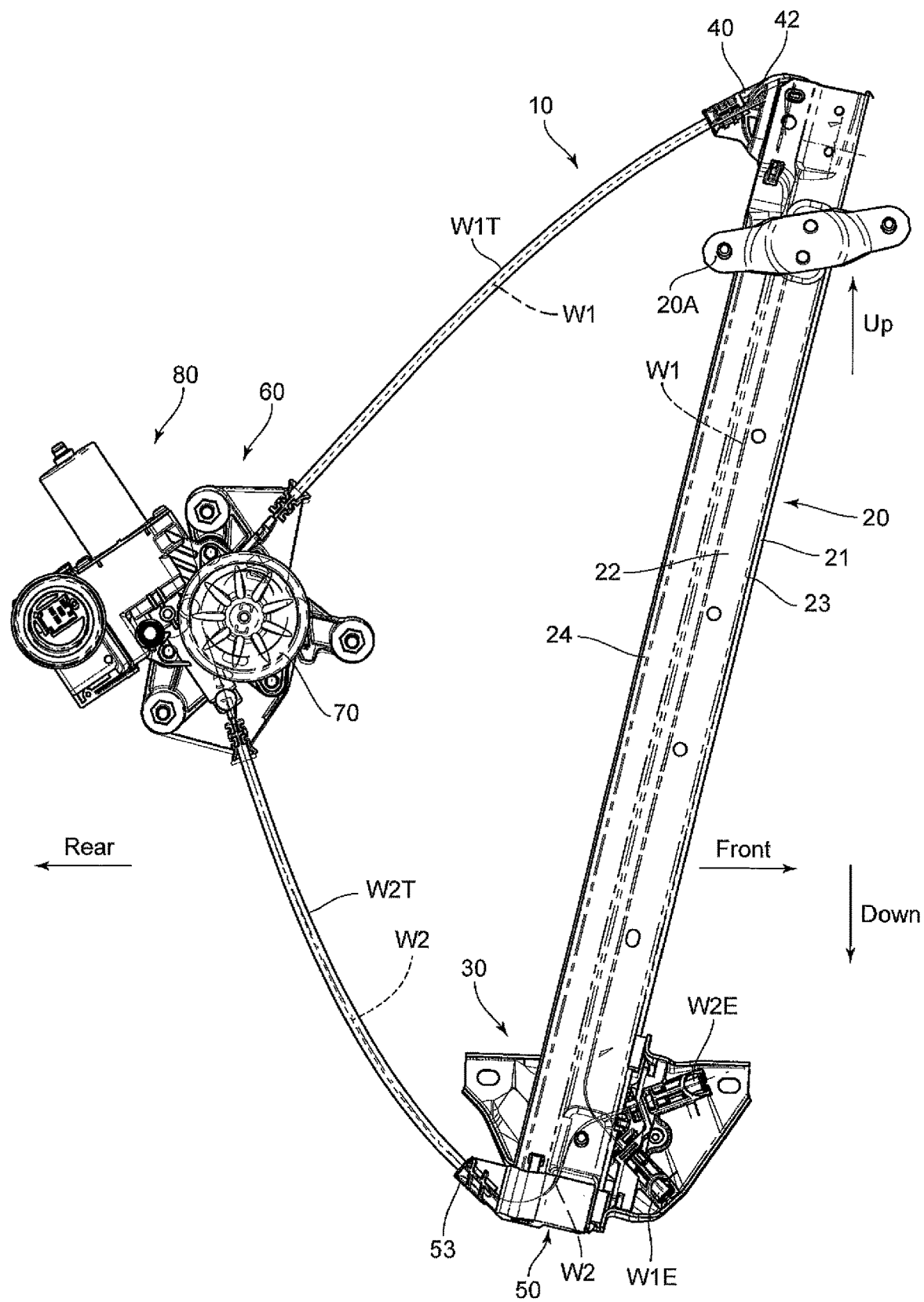
FIG. 2 is a back view viewing the wire type window regulator from a vehicle inner side.

The following describes an embodiment of a wire type window regulator 10 of the present invention. As illustrated in FIG. 1, the wire type window regulator 10 includes a guide rail 20 as an elongated member. The guide rail 20 is mounted to an inside of a door panel (inner panel) 100 (FIG. 5 and FIG. 6) of a vehicle via brackets 20A (only one of them is illustrated) disposed on different positions in a longitudinal direction. The guide rail 20 is arranged having the longitudinal direction in an almost height direction of the vehicle in a state of being mounted to the door panel 100 of the vehicle. The guide rail 20, the brackets 20A, and the door panel 100 of the vehicle are made of a metallic material.

The wire type window regulator 10 includes a slider base (glass carrier) 30 that is supported to the guide rail 20 so as to freely move up and down and to which a window glass (not illustrated) is supported. Wire ends W1E and W2E, which are one ends of a pair of drive wires W1 and W2, respectively, are coupled to this slider base 30.

A pulley bracket 40, which is a wire guide member to change the routing direction of the drive wire W1, is fixed adjacent to an upper end in the longitudinal direction of the guide rail 20, and a guide pulley 42 is rotatably supported to this pulley bracket 40 via a pulley support shaft 44. The drive wire W1 extends from the slider base 30 in an upward direction of the guide rail 20 along the guide rail 20, and is supported by a wire guide groove formed on an outer peripheral surface of the guide pulley 42. Corresponding to advance and retreat of the drive wire W1, the guide pulley 42 rotates around the pulley support shaft 44.

A wire guide member 50 is disposed adjacent to a lower end in the longitudinal direction of the guide rail 20. The drive wire W2 extends from the slider base 30 in a downward direction of the guide rail 20 along the guide rail 20, and is guided by the wire guide member 50 to change the routing direction of the drive wire W2. The wire guide member 50 is fixed to the guide rail 20, and the drive wire W2 is supported such that the drive wire W2 is configured to advance and retreat along a wire guide groove 54 formed on the wire guide member 50.

The drive wire W1 coming out from the guide pulley 42 is inserted through a tubular outer tube W1T and wound around a drive drum 70 disposed inside a drum housing 60 to which the outer tube W1T is coupled. The drive wire W2 coming out from the wire guide member 50 is inserted through a tubular outer tube W2T and wound around the drive drum 70 disposed inside the drum housing 60 to which the outer tube W2T is coupled.

A motor unit 80 is mounted to the drum housing 60. The motor unit 80 includes a driving motor, which rotates the drive drum 70, and a gear box (not illustrated).

The outer tube W1T has one end coupled to the pulley bracket 40 and the other end coupled to the drum housing 60, and the drive wire W1 is configured to advance and retreat in the outer tube W1T having thus determined both end positions. The outer tube W2T has one end coupled to the wire guide member 50 and the other end coupled to the drum housing 60, and the drive wire W2 is configured to advance and retreat in the outer tube W2T having thus determined both end positions.

The drum housing 60 is fixed to the door panel 100 (FIG. 5 and FIG. 6) of the vehicle. When the driving force of the motor in the motor unit 80 positively/reversely rotates the drive drum 70, one of the drive wire W1 and the drive wire W2 increases a winding amount around the drive drum 70, and the other is drawn out from the drive drum 70, thus causing the slider base 30 to move along the guide rail 20 due to a relationship of pulling and loosening between the drive wire W1 and the drive wire W2. Corresponding to the move of the slider base 30, the window glass (not illustrated) moves up and down.

Figure 3:
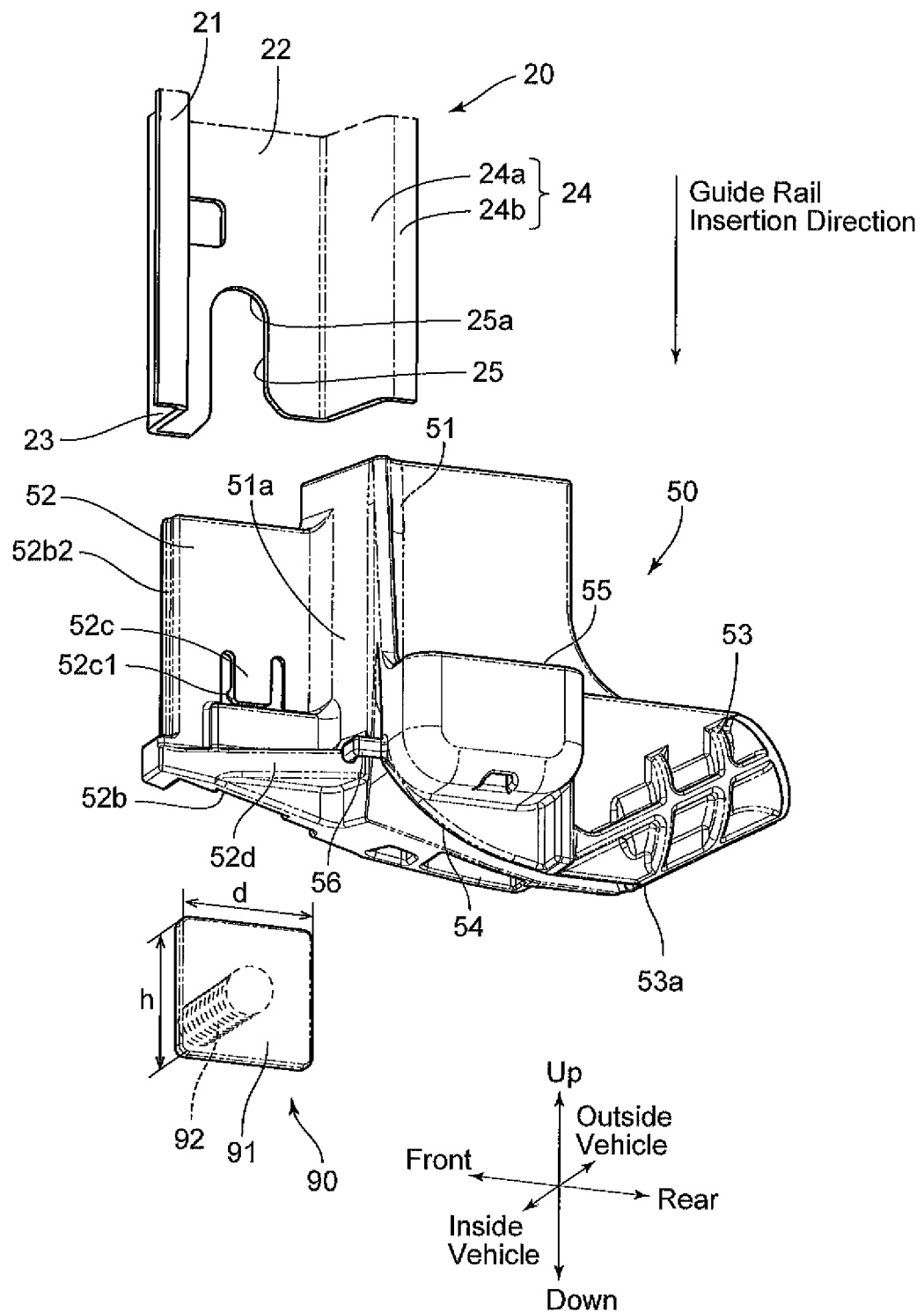
FIG. 3 is a perspective view of a guide rail lower end of the wire type window regulator of FIG. 1 and a lower wire guide member alone mounted to this guide rail.
Figure 6:
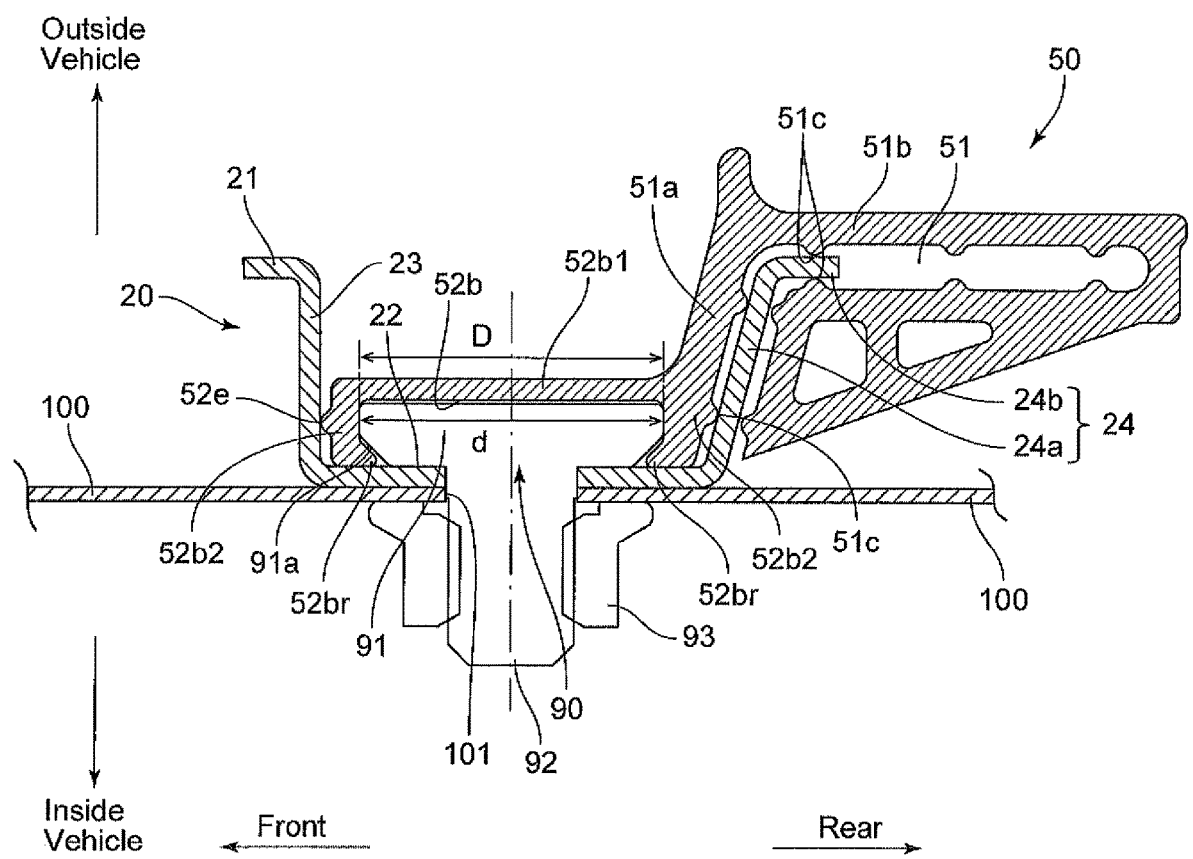
FIG. 6 is a cross-sectional view taken along the line VI-VI of FIG. 4.

The following describes details of the guide rail 20 and the wire guide member 50 in the wire type window regulator 10 having the above-described basic configuration with reference to FIG. 3 and the subsequent drawings. As illustrated in FIG. 3 and FIG. 6, the guide rail 20 has a hat shape in the cross-sectional surface and includes vehicle front-rear direction rail portions 21 and 22 on a vehicle inner side and a vehicle outer side, a front-rear position restricting rail portion (longitudinal wall) 23 that couples these vehicle front-rear direction rail portions 21 and 22, and a hook-shaped rail portion 24 that extends from an end on a side opposite to the front-rear position restricting rail portion 23 of the vehicle front-rear direction rail portion 22 to the vehicle outer side. The hook-shaped rail portion 24 includes an inclined portion (longitudinal wall) 24a and a front-rear direction rail portion 24b. The inclined portion 24a expands a distance from the front-rear position restricting rail portion 23 as away from the vehicle front-rear direction rail portion 22 and is inclined both in the vehicle front-rear direction and the vehicle-width direction. The front-rear direction rail portion 24b is configured to be parallel to the vehicle front-rear direction rail portion 21.

This guide rail 20 includes a slit 25 with an open lower end extending upward at the lower end of the vehicle front-rear direction rail portion 22. The upper end of this slit 25 constitutes a semicircular portion 25a.

The wire guide member 50 is formed of a molded product made of a synthetic resin material and includes an insertion portion (groove) 51, a supporting portion 52 of a metal bolt (fixing member) 90, a tubular tube insertion portion 53, the wire guide groove 54, a restricting portion (surface) 55, and a disconnection prevention tab 56. The above-described guide rail 20 is inserted into the insertion portion 51. The distal end of the outer tube W2T is inserted into the tubular tube insertion portion 53. The wire guide groove 54 extends on a plane identical to a surface including an axis line of the tubular tube insertion portion 53 (outer tube W2T) in an arc shape in front view. The restricting portion 55 restricts an end of descent of the slider base 30. The disconnection prevention tab 56 temporarily holds the drive wire W2 before the drive wire W2 is fitted to (engaged with) the wire guide groove 54. The tubular tube insertion portion 53 includes a slit 53a into which the drive wire W2 is inserted.

The hook-shaped rail portion 24 of the guide rail 20 is inserted into the insertion portion 51. The insertion portion 51 includes an inclined portion 51a, which has an inclination corresponding to the inclination of the inclined portion 24a, and a front-rear direction portion 51b corresponding to the front-rear direction rail portion 24b. A plurality of rows of contact ribs (ribs) 51c are formed at the inner surface of the insertion portion 51. The contact ribs 51c extend in the up-down direction (the insertion direction of the guide rail 20) and linearly contact with the inserted guide rail 20. The plurality of contact ribs 51c elastically compress and hold the hook-shaped rail portion 24 (the inclined portion 24a and the front-rear direction rail portion 24b) of the guide rail 20 inserted into the insertion portion 51 from the front and the back surfaces.

Figure 5:
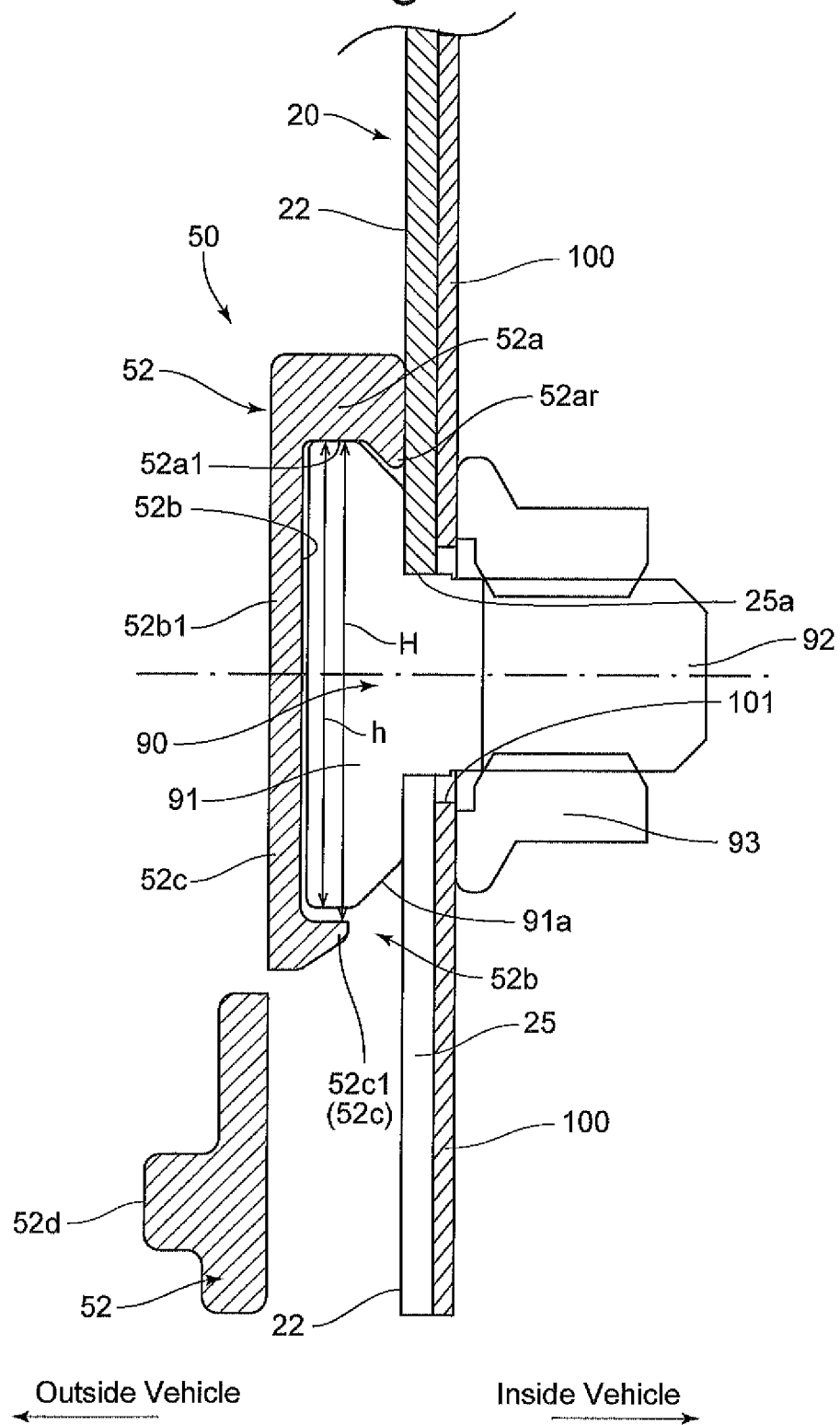
FIG. 5 is a cross-sectional view taken along the line V-V of FIG. 4.

In the supporting portion 52, a surface at the lower end and on the vehicle front-rear direction rail portion 22 side of the guide rail 20 is open, and the upper end is formed of a groove with bottom 52b blocked with a block portion 52a (FIG. 5). That is, as illustrated in FIG. 6, the groove with bottom 52b has a vehicle front-rear direction wall 52b1 and vehicle-width direction walls 52b2. The vehicle front-rear direction wall 52b1 is opposed (parallel) to the vehicle front-rear direction rail portion 22 of the guide rail 20 inserted into the insertion portion 51. The vehicle-width direction walls 52b2 extend from both ends in the front-rear direction of this vehicle front-rear direction wall 52b1 to the vehicle inner side. Between the distal ends (the ends on the side opposite to the vehicle front-rear direction wall 52b1) of the pair of vehicle-width direction walls 52b2 is open. The vehicle front-rear direction rail portion 22 of the guide rail 20 inserted into the insertion portion 51 is positioned at this open portion. The end surface on the vehicle inner side of the vehicle-width direction wall 52b2 contacts the vehicle front-rear direction rail portion 22, and the surface on the vehicle inner side of the vehicle front-rear direction rail portion 22 is exposed. Among the pair of vehicle-width direction walls 52b2, a reinforcing rib 52e, which extends in the up-down direction and abuts on the front-rear position restricting rail portion 23, is formed at the vehicle-width direction wall 52b2 positioned on the front-rear position restricting rail portion 23 side of the guide rail 20.

Figure 4:
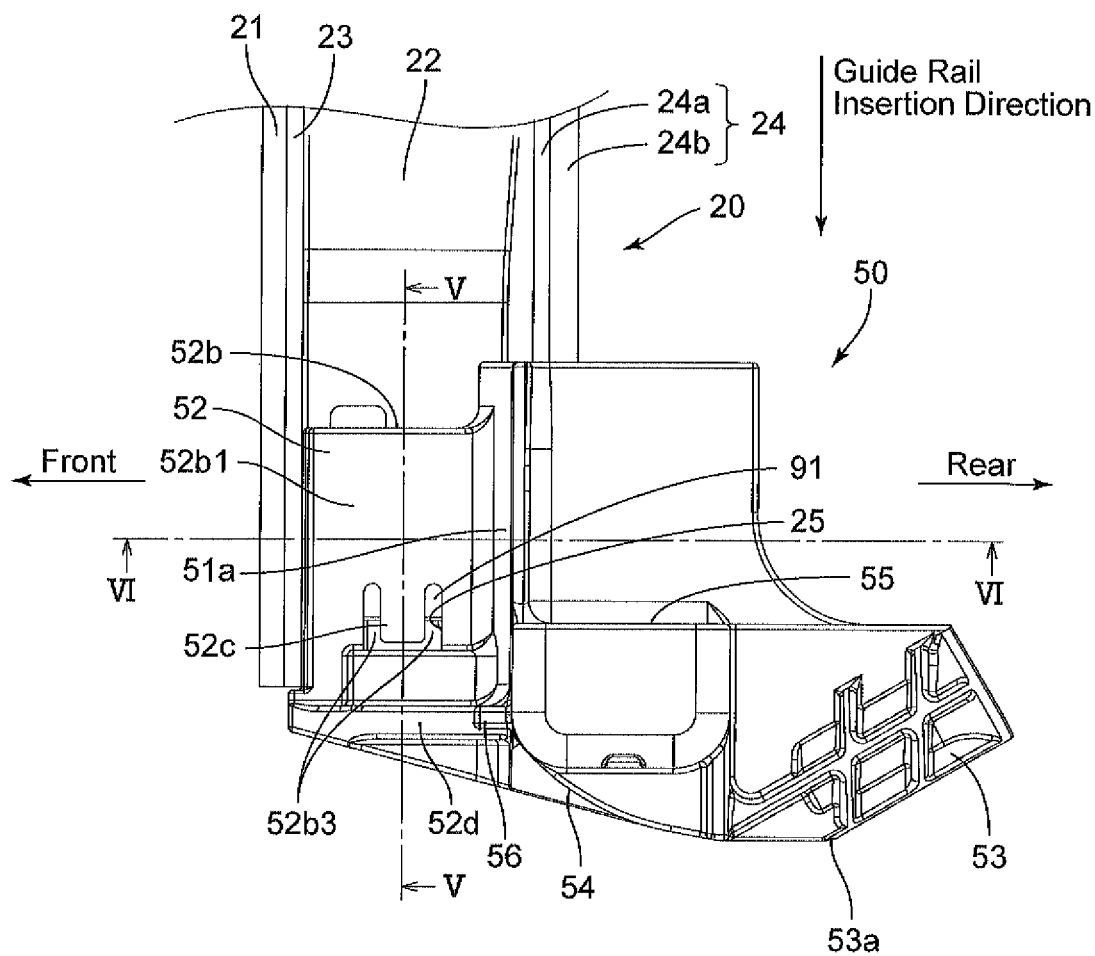
FIG. 4 is a front view viewing the lower wire guide member at the guide rail lower end from the vehicle inner side.

As illustrated in FIG. 4 and FIG. 5, at the vehicle front-rear direction wall 52b1, a pair of slits 52b3 whose lower end is open forms elastic retaining arms (elastic locking members) 52c. A retaining hook (elastic locking member) 52c1 (FIG. 5), which projects to the inward of the groove with bottom 52b, is formed at the lower end of this elastic retaining arm 52c. The supporting portion 52 includes a projecting reinforcing rib 52d (FIG. 3, FIG. 4, and FIG. 5). The reinforcing rib 52d is positioned downward the elastic retaining arms 52c and joins the vehicle front-rear direction wall 52b1 and the inclined portion 51a together.

The metal bolt 90 has a fastening head 91 and a male thread portion 92. The fastening head 91 has a square shape (rectangular shape) in plan view and the male thread portion 92 projects from the center of the one side surface of the fastening head 91. An interval D (FIG. 6) between the pair of vehicle-width direction walls 52b2 of the supporting portion 52 corresponds to a front-rear direction width d (FIG. 3 and FIG. 6) of this fastening head 91 of the metal bolt 90. An interval H (FIG. 5) between an inner surface 52a1 (FIG. 5) of the block portion 52a and a retaining hook 52c1 of the elastic retaining arm 52c corresponds to an up-down direction width h (FIG. 3 and FIG. 5) of the fastening head 91.

With the guide rail 20 inserted into the insertion portion 51 of the wire guide member 50, the fastening head 91 of the metal bolt 90 is inserted into the groove with bottom 52b from the lower side. During this insertion, the male thread portion 92 of the metal bolt 90 is fitted to the slit 25 at the lower end of the guide rail 20. The fastening head 91 is fitted into the groove with bottom 52b while warping the elastic retaining arms 52c. In the insertion completion state, the retaining hooks 52c1 are engaged with the lower end of the fastening head 91 to prevent the metal bolt 90 from dropping. At this time, the male thread portion 92 runs along the semicircular portion 25a of the slit 25. In the state where the fastening head 91 of the metal bolt 90 is thus inserted into the groove with bottom 52b, the surface on the vehicle inner side of the fastening head 91 contacts the surface on the vehicle outer side of the vehicle front-rear direction rail portion 22 of the guide rail 20 inserted into the insertion portion 51 (FIG. 5 and FIG. 6). A chamfering 91a is performed on the edge of the surface on the vehicle inner side of the fastening head 91. The block portion 52a and the groove with bottom 52b include ribs 52ar and 52br positioned inside this chamfering 91a. Since these chamfering 91a and the ribs 52ar and 52br are to stably hold the metal bolt 90 to the groove with bottom 52b and are not compressed.

With the wire type window regulator 10 described above, the wire guide member 50 supports the metal bolt (fixing member) 90, the metal bolt 90 is inserted through the slit 25 of the guide rail 20, and the metal bolt 90 fixes the guide rail 20 and the wire guide member 50 to the door panel 100 of the vehicle. That is, the guide rail 20 is inserted into the insertion portion 51 of the wire guide member 50, and as illustrated in FIG. 5, FIG. 6, with the metal bolt 90 supported to the supporting portion 52, the guide rail 20 and the wire guide member 50 are fastened and fixed together to the door panel 100 of the vehicle with the metal bolt 90 and a nut 93. Specifically, the male thread portion 92 of the metal bolt 90 is inserted into a fastening hole 101 formed at the door panel 100 of the vehicle, and the nut 93 is screwed with the male thread portion 92 projecting from the fastening hole 101, thus fixing the guide rail 20 to the door panel 100 of the vehicle. Since the guide rail 20 and the wire guide member 50 are fixed to the door panel 100 of the vehicle via the metal bolt 90, even when a load is applied on the guide rail 20, a deformation of the wire guide member 50 and the like are less likely to occur.

In this fixed state, the fastening head 91 of the metal bolt 90, the vehicle front-rear direction rail portion 22 of the guide rail 20, and the door panel 100 of the vehicle are in contact (metal touch) in order and the compressive force is not applied on the wire guide member 50. In other words, with the guide rail 20, the front and back surfaces of the vehicle front-rear direction rail portion 22 abut on the door panel 100 of the vehicle and the fastening head 91 of the metal bolt 90 while sandwiched between them (sandwich metal touch structure). At this time, the inner surface 52a1 of the block portion 52a of the wire guide member 50 contacts the upper end of the fastening head 91, and the semicircular portion 25a of the slit 25 contacts the male thread portion 92 to prevent the downward move of the wire guide member 50. Especially, when the slider base 30 reaches the end of descent and the force of descent is applied to the wire guide member 50 via the restricting portion (surface) 55, the downward move of the wire guide member 50 is prevented.

When the nut 93 is fastened, the rotation force applied to the wire guide member 50 via the male thread portion 92 and the fastening head 91 is mainly received by an abutting portion between the reinforcing rib 52e and the front-rear position restricting rail portion 23 of the guide rail 20 and an abutting portion between the contact ribs 51c and the inclined portion 24a of the guide rail 20, thus surely preventing the rotation of the wire guide member 50. While the above-described embodiment configures the fastening head 91 of the metal bolt 90 into the rectangular shape, the shape may be another noncircular shape or may be a circular shape.

With the above-described wire type window regulator 10, the wire guide member 50 includes the elastic retaining arms 52c, which is engaged with the fastening head 91 of the nut 93 inserted into the insertion portion 51 to retain the nut 93. This eliminates the possibility of the inserted nut 93 dropping from the wire guide member 50, facilitating the assembly work.

With the above-described wire type window regulator 10, the work to insert the guide rail 20 into the insertion portion 51 of the wire guide member 50 and the work to mount the metal bolt 90 (insert the metal bolt 90 into the groove with bottom 52b and the slit 25) are independent from one another, facilitating the assembly work.

While the above-described embodiment applies the present invention to the wire guide member 50 at the lower end of the wire type window regulator 10, the present invention is also applicable to the wire guide member at the upper end.

INDUSTRIAL APPLICABILITY

The wire type window regulator of the present invention is preferable for, for example, application to a wire type window regulator that moves up and down a window glass of a vehicle.

DESCRIPTION OF REFERENCE SIGNS 10 wire type window regulator
20 guide rail
21, 22 vehicle front-rear direction rail portion
23 front-rear position restricting rail portion (longitudinal wall)
24 hook-shaped rail portion 24a inclined portion (longitudinal wall)
24b front-rear direction rail portion
25 slit
25a semicircular portion
30 slider base (glass carrier)
40 pulley bracket
42 guide pulley
44 pulley support shaft
50 wire guide member
51 insertion portion (groove)
51a inclined portion
51b front-rear direction portion
51c contact rib (rib)
52 supporting portion
52a block portion
52b groove with bottom
52b1 vehicle front-rear direction wall
52b2 vehicle-width direction wall
52c elastic retaining arm (elastic locking member)
52c1 retaining hook (elastic locking member)
52e reinforcing rib (rib)
53 tubular tube insertion portion
54 wire guide groove
55 restricting portion (surface)
56 disconnection prevention tab
60 drum housing
70 drive drum
80 motor unit (wire driving mechanism)
90 metal bolt (fixing member)
91 fastening head
91a chamfering
92 male thread portion
93 nut
100 door panel (inner panel) of vehicle
W1 drive wire
W1T outer tube
W2 drive wire
W2T outer tube

The invention claimed is:

1. A wire window regulator fixed to a door panel of a vehicle, comprising:
   a guide rail that guides a slider base to freely move up and down, a window glass being fixed to the slider base;
   a wire driving mechanism that moves up and down the slider base along the guide rail via a drive wire; and
   a wire guide member disposed on at least one of an upper end and a lower end of the guide rail, the wire guide member changing a routing direction of the drive wire wound around the wire guide member, wherein:
   the wire guide member includes a guide rail insertion portion, the wire guide member supporting a fixing member,
   the guide rail is inserted into the guide rail insertion portion, the fixing member being inserted through the guide rail,
   the fixing member fixes the guide rail and the wire guide member to the door panel of the vehicle,
   wherein when the fixing member fixes the guide rail and the wire guide member to the door panel of the vehicle, the fixing member, the guide rail and the door panel come into contact with each other in the stated order along a fixing direction of the fixing member, and
   wherein the guide rail defines a slit having an open end opening to at least one of the upper end and the lower end of the guide rail, and the fixing member is inserted into the slit.

2. The wire window regulator according to claim 1, wherein the guide rail, the door panel of the vehicle, and the fixing member are made of a metal, the fixing member is supported to the wire guide member and contacts one end of the guide rail, and the guide rail contacts the door panel of the vehicle.

3. The wire window regulator according to claim 2, wherein the guide rail has front and back surfaces contacting and sandwiched between the door panel of the vehicle and the fixing member.

4. The wire window regulator according to claim 1, wherein the guide rail has a pair of longitudinal walls, the pair of longitudinal walls are separated in a vehicle front-rear direction and extend in a vehicle-width direction, the wire guide member includes a supporting portion to support the fixing member, and the supporting portion contacts the pair of longitudinal walls of the guide rail.

5. The wire window regulator according to claim 1, wherein the wire guide member includes an insertion portion into which one end of the guide rail is inserted, the insertion portion includes a plurality of ribs, the plurality of ribs extend in an insertion direction of the guide rail, and the plurality of ribs linearly contact the inserted guide rail.

6. The wire window regulator according to claim 1, wherein the wire guide member includes an elastic locking member, and the elastic locking member retains the fixing member supported to the wire guide member.

7. The wire window regulator according to claim 1, wherein the guide rail and the wire guide member are integrated by inserting the guide rail into the guide rail insertion portion, and the integrated guide rail and wire guide member are fixed to the door panel of the vehicle by the fixing member.

8. The wire window regulator according to claim 1, wherein the guide rail, the wire guide member, and the fixing member are integrated, and the integrated guide rail, wire guide member, and fixing member are fixed to the door panel of the vehicle.

* * * * *